United States Patent Office 3,036,463
Patented May 29, 1962

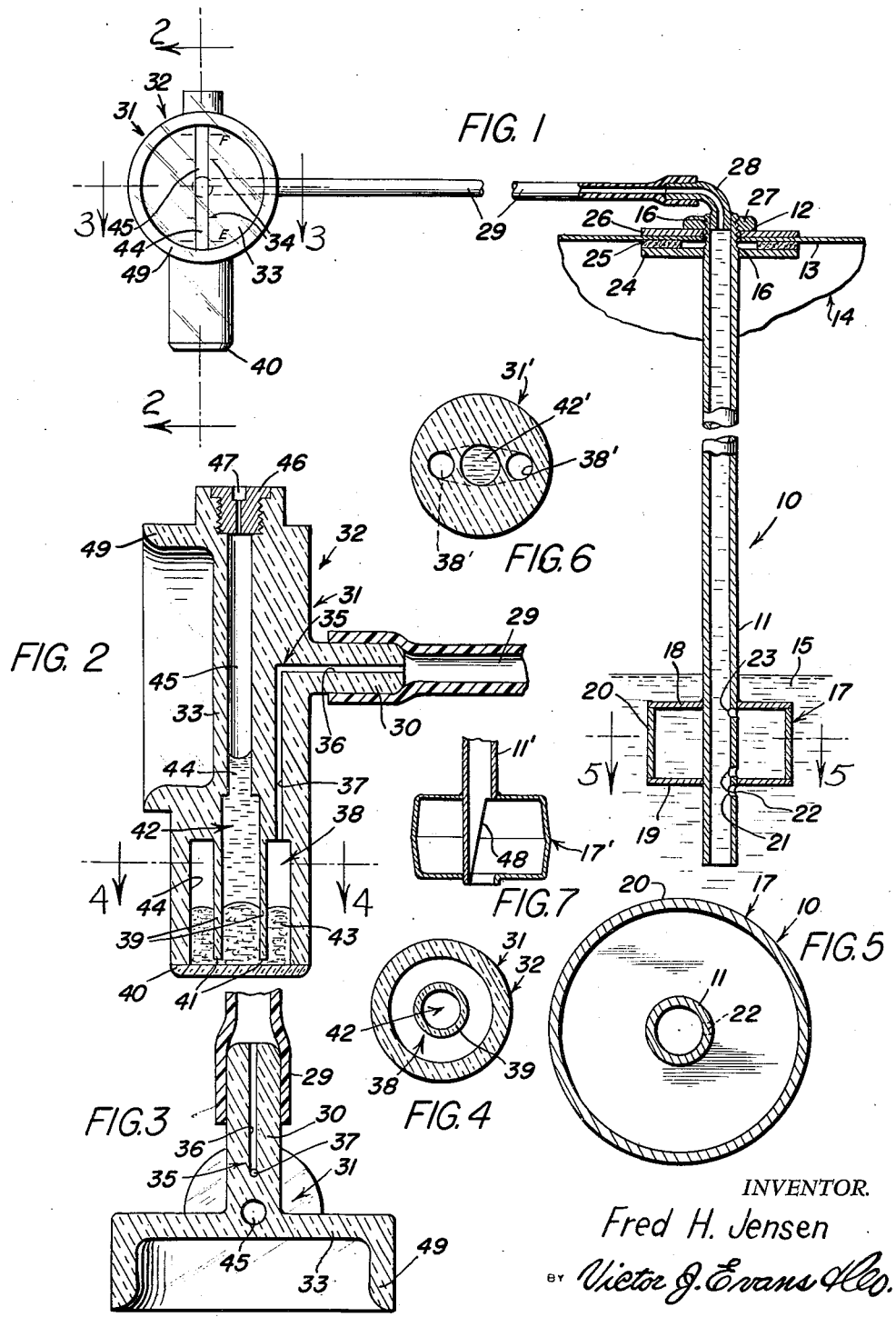

3,036,463
LIQUID LEVEL PRESSURE TRANSDUCER AND INDICATING DEVICE
Fred H. Jensen, 6849 32nd NE., Seattle 15, Wash.
Filed Jan. 14, 1958, Ser. No. 708,939
3 Claims. (Cl. 73—299)

This invention relates to a means for measuring the level of liquid in a container.

The object of the invention is to provide a liquid level measuring device which includes a transducer that is arranged in engagement with a tank containing liquid to be measured or gauged, and wherein there is further provided an indicating device which is connected to a transducer so that with the indicating device arranged at a remote location, a person will be able to readily determine the level or quantity of liquid in the container.

A still further object of the invention is to provide a liquid level measuring means which is extremely accurate, and wherein the device is constructed so that there are no moving parts whereby the device will withstand rough usage and will perform efficiently for the purpose for which it is intended.

A further object of the invention is to provide a liquid level measuring apparatus which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is an elevational view illustrating the liquid level measuring apparatus of the present invention, and with parts broken away and in section.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 2.

FIGURE 5 is a sectional view on an enlarged scale taken on the line 5—5 of FIGURE 1.

FIGURE 6 is a view similar to FIGURE 4 but illustrating a modification.

FIGURE 7 is a fragmentary sectional view illustrating a further modification.

Referring in detail to the drawings, the numeral 10 indicates a liquid level pressure transducer, and the transducer 10 includes a vertically disposed tube 11 which has its upper end extending through an opening 12 in the top wall 13 of a tank or container 14. The numeral 15 indicates in FIGURE 1 the liquid whose level is being gauged or measured by the apparatus of the present invention. As shown in FIGURE 1, the upper end of the tube 11 is threaded as at 16.

Secured to the lower portion of the tube 11 is a cup 17 which includes a top portion 18 and a bottom portion 19 as well as a side portion 20. The numerals 21, 22 and 23 indicate spaced apart apertures or openings which are arranged in the lower portion of the tube 11.

Arranged below the top wall 13 of the tank 14 and secured to the upper end of the tube 11 is a washer 24, and a sealing gasket 25 is interposed between the washer 24 and top wall 13. There is further provided a second washer 26 which is arranged above the wall 13, and a securing element 27 which may be a nut, is arranged in threaded engagement with the upper threaded portion 16 of the tube 11.

Extending upwardly from the top of the tube 11 is a fitting 28 which is connected to one end of a conduit 29, and the conduit 29 leads to a neck 30 of a body member 31, and the body member 31 forms part of an indicating device 32 which may be mounted in a suitable location such as on the dashboard or instrument section of a vehicle. The tank 14 may be the fuel tank of a vehicle, but it is to be understood that the present invention is not restricted to such a vehicle since the principle of the present invention is applicable to many different types of apparatus or structures.

The body member 31 may be made of transparent material and includes a transparent wall member 33 which has reference marks or scale markings 34 thereon, FIGURE 1. There is provided in the body member 31 an L-shaped passageway 35 which includes a portion 36 which communicates with the conduit 29, and there is further provided a right angularly arranged portion 37 that has its lower end communicating with a chamber 38 in the bottom of the body member 31. There is further provided a cylindrical skirt portion 39, and the numeral 40 indicates a cap that is secured to the bottom of the body member 31, the lower edge of the skirt portion 39 being separated from the cap 40 by means of a space 41. The skirt portion 39 defines therein a compartment 42, and the numeral 43 indicates mercury which is arranged in the lower portion of the compartment 42 and chamber 38. Arranged above the mercury 43 is a colored indicating fluid 44. The numeral 45 indicates a bore which communicates with the compartment 42, and a plug 46 is arranged in engagement with the upper end of the bore 45, there being a vent opening 47 in the plug 46.

Referring now to FIGURE 6 of the drawings, there is shown a modification of the indicating device wherein the body member 31' has substantially the same construction and function as the body member 31, except that the body member 31 has a pair of cylindrical recesses 38' instead of the chamber 38, and the numeral 42' indicates the compartment which has its lower end communicating with the bottom of the recesses 38'.

Referring now to FIGURE 7 of the drawings, there is shown a modification of the transducer wherein the numeral 11' indicates a tube which functions in a manner similar to the tube 11, and the lower end portion of the tube 11' is cut-away diagonally as at 48 in the vicinity of the air reservoir casing 17', for a purpose to be later described.

As shown in the drawings, the body member 31 is provided with a cylindrical flange or wall section 49.

Thus, it will be seen that there has been provided an apparatus for measuring the level of liquids and wherein the apparatus includes a liquid level pressure transducer 10 and the liquid level indicating instrument 32. The transducer 10 is constructed so that it can be introduced into existing tanks through the filler cap and this can be done easily and quickly. The indicating instrument can be built in different forms so as to take advantage of production or other problems. The chamber 38 may be in the form of two similar holes 38', one on either side of the compartment 42', as shown in FIGURE 6, rather than in the form of an annulus 38. This construction would provide all of the inherent balance such as is required on vehicles, boats and the like, as would the concentric construction which is illustrated. The plug 46 has an opening 47 which provides a vent to the atmosphere.

There are three components usually involved in the problem of designing and producing a device for the measuring of liquid level or quantity in a liquid container and indicating this level at a remote site from the container such as the container 14 and this problem may consist of the following elements. First, a device usually situated in a container which translates liquid level into some form of signal which is often referred to as a transducer. Secondly, a means of communicating this signal to an indicating device, and third an indicating device which translates this signal back into terms of liquid level or quantity for convenient display.

Heretofore, many devices have been introduced to attempt this job in a more or less satisfactory manner, and all of the prior devices or combinations have been limited or handicapped by high cost, as well as by complicated construction, and by various errors and in some cases such equipment has been so delicate and subject to being easily damaged or worn in use so that it was difficult to maintain accuracy thereof. Furthermore, many of these prior devices required an outside source of energy such as electrical energy and some of the prior devices are not convenient to use in all situations. A simple illustration of some of these problems is that of measuring the quantity of gasoline in automobile and other vehicle tanks and it is common knowledge that many electrically operated gas gauges do not accurately and reliably indicate the true quantity of gasoline. Some of the sources of error and trouble are caused by the following.

First is the problem of translating change in liquid level to an appropriate electrical signal. Here, both mechanical and electrical error are introduced, and also wear and mechanical damage are often problems.

Secondly, the problem of transmitting this electrical signal accurately, is affected by condition of the vehicle's electrical system or voltage and the voltage varies with age of batteries, change in resistance of electrical connections, temperature and generator output or charging rate. The temperature also changes the resistance of a conductor and hence can introduce further error.

Third, the electrical indicating instruments commonly used are subject to both mechanical and electrical error. In recent years the electrical-mechanical liquid level indicating systems used on vehicles are an increasing source of trouble and annoyance.

The present invention seeks to provide a system of remote liquid level indication which overcomes the aforementioned disadvantages or difficulties.

Thus, the device of the present invention is highly accurate and is as constant as gravity and is basically not affected by temperature. Furthermore, there is provided a system which accurately measures the change in level from empty to full, to where the tank is completely filled and this cannot be done with a system using a float operated transducer since the float must have reserve buoyancy to insure operation which is to state that the float must stop rising at some point before the tank is completely filled. Furthermore, the present invention is not affected by friction of parts in the transducer or indicator and is not affected by change in the electrical system since there is no connection with or dependence on the vehicle's electrical system. Furthermore, the accuracy of re-calibration required by exchange or repair of defective tanks, accident to vehicle or the like are solved since no re-calibration is required except to momentarily let the gasoline level fall to minimum level. The present invention makes it practical to design the indicating instrument to read with no parallax error due to variation in direction or angle from which the instrument is viewed.

Furthermore, the present invention is easily and simply installed and it is convenient to install in existing tanks and also easy to install in original equipment manufactured at the factory.

With respect to the mechanical advantages, there is nothing to rattle, wear or deteriorate with age and use, and a liquid-vapor tight connection is easily made in installing either in original equipment manufacture or as an accessory item. Furthermore, great design latitude is insured to permit variation in location of indicating scale for special applications, and easy and convenient readability and day and night scale illumination are inherent advantages resulting from this invention.

The device has maximum safety and there is no connection with electrical energy and the cost is quite low.

According to the present invention there is provided the indicating device 32 and the transducer 10, and different types of indicating devices can be used with the transducer. For example, the transducer can be used in liquid containers which are so large that the signal pressures developed would be of such magnitude that a different type of indicating instrument would be preferable or necessary. However, for small liquid containers such as found on vehicles, the use of the special transducer with the herein described special indicating instrument is believed to be most convenient and practical.

It is to be noted that the indicating instrument provides a method of getting a convenient scale spread for easy and accurate readability with a limited range of signal pressure variation and this is done by means of the special form of manometer.

It is to be understood that the present invention is not limited to use on vehicles but can be used for such diverse problems as indicating level in fuel and water tanks aboard boats, for industrial engines particularly magneto equipped gasoline and Diesel engines where electrical or other standby energy may not be readily available. Also, application may be found for commercial and industrial use for liquid level indication, draft gauges and the like.

The parts can be made of any suitable material and in different shapes or sizes.

In actual practice, the air reservoir casing 17 is securely and tightly affixed to the tube 11 and the washer 24 is secured to the upper end of the tube 11 as by brazing or other suitable means.

As shown in FIGURE 7, the tube 11' may have its lower portion cut-away at a diagonal as at 48 so as to permit ingress of vapor or air into the tube 11' from the air reservoir casing 17'. This cut 48 is so designed that it would be possible to displace all vapor or air contained in the reservoir casing into the tube. This serves to insure complete use of capacity of the reservoir casing. At the same time, this diagonal portion of the tube helps insure complete drainage from the tube of liquid which may have worked up into the tube as a result of unusual conditions or accident. Where design will permit, the reservoir casing is preferably greater in diameter than in height.

A further uniqueness for the tube is to have such a minimum inside diameter that surface tension and viscosity of the liquid being measured is not sufficient to hold the liquid up in the tube as can be done with a pipette and this works out to substantially .269" inside diameter for gasoline and would be over .269" for heavier materials such as oils.

In addition, the diagonal cut 48 on the bottom of tube 11' assists the wetting action and surface tension of the liquid to work in such a manner as to complete drainage of the tube to thereby let vapor or air enter the tube by pressure differential which may exist and by upward displacement from the cup upon refilling of the tank.

In FIGURE 1 the numeral 25 indicates a sealing washer or gasket, and the numeral 26 indicates a washer to distribute clamping pressure from the assembly nut 27. The numeral 28 indicates a suitable connector or fitting which joins the tube 11 to the pressure communicating conduit or tube 29, and the conduit 29 communicates changes in pressure from the transducer 10 to the indicating element 32.

The construction of the invention provides a simple means of measuring pressure at a selected point adjacent to the bottom of tube 11, specifically the location of hole 21 which is produced by height of liquid above this point. Since this pressure will vary as the height of liquid varies, it is a measure of the quantity of liquid 15 above that point.

It is to be noted that expansion or contraction of fluid due to temperature change will not affect the weight of the fluid. Thus, no error will be introduced here by temperature change.

In view of the fact that the volume of air or vapor contained in the indicating instrument and communicating tube is relatively small, as compared to the total volume of such instrument, tube and air reservoir casing 17 temperature change causing expansion and contraction of this vapor will introduce only a small error by causing a small change of level of the boundary between air or vapor in the cup and liquid. The indication of the gauge is a measure of the pressure exerted on the liquid in the tube 11 and air reservoir casing 17 rather than corresponding to the volume of gas in such tube and reservoir casing.

Referring in particular now to the improved type of manometer or indicating instrument 32, the reference marks 34 which may indicate "empty" and "full" by the letters "E" and "F," are adapted to be printed or engraved on the rear surface of the clear plastic dial or wall 33 of the instrument so that the marks will lie in a plane through the center line of the indicating fluid column and this avoids any parallax error in reading the instrument. A further advantage in this construction is that it provides a smooth flat dial surface and also protects the engraving from dirt and damage which might result from cleaning the dial surface.

The main body of the indicating instrument 32 may be made of transparent plastic material, and the numeral 40 indicates a sealing cap which may also be made of plastic. The numeral 45 indicates a bore which receives the colored indicating fluid 44 and ther is provided the compartment 42 which contains colored indicating fluid 44 in its upper end and mercury 43 in the lower portion thereof. The extension or skirt 39 terminates a short distance above the sealing cap 40 so as to provide communication between the compartment 42 and chamber 38. The passageway 35 establishes communication between the conduit 29 and chamber 38. The mercury 43 establishes communication between the chamber 38 and compartment 42 through the small space 41. The reference marks 34 are preferably arranged on the rear surface of the dial 33 and lie in a plane which is substantially through the vertical center of the bore 45.

From the foregoing, it can be easily demonstrated that by simple calculation involving maximum and minimum liquid levels to be measured, that density of the liquid, density of the colored indicating fluid 44, density of mercury 43, and the relative sectional areas of the bore 45, bore 42 and chamber 38, that the transducer 10 and indicating instrument 32 can be readily designed to insure a desired scale spread for convenience and accuracy in reading. For example, for indicating a rise and fall of 6⁷⁄₁₆″ of gasoline where the mercury level differential is approximately .288″ and the desired scale spread or length is ⅞″, it will be seen that a highly efficient arrangement is provided, and these proportions can be varied as desired.

Thus, it will be seen that there has been provided a sounding tube which projects into the liquid to be measured, and there is provided an air reservoir casing which is secured to the tube adjacent to its lower end and the reservoir casing is provided with openings adjacent thereto, and the tube has such a minimum inside diameter that air and vapor pressure which may communicate with its lower opening will not support a column of the liquid in its base. The tube may be modified so as to have the diagonal cut-away portion 48 to further assist in drainage of remaining liquid in the tube, and the tube is provided with the washer 24, sealing gasket 25 and loose clamping washer 26 and assembly nut 27. There is further provided the fitting 28 for engagement with the conduit or tube 29 and the tube may be used in tanks of various depths and different types of convenient indicating means can be used therewith.

With respect to the indicating instrument, the body member 31 may be made of transparent material and bore 45 and compartment 42 communicate with each other and there is provided the small passageway 35, and the indicating fluid 44 and mercury 43 are provided as previously described. The mercury is sufficiently heavy so that it remains in the lower portion of the device.

The body member is constructed so that a convenient length of indicating scale is provided and wherein there will be provided an accurate indication of the quantity of liquid to be measured over the scale length selected. The body has a printed or engraved scale in a plane substantially through the center of the indicating fluid so as to eliminate parallax error in reading, and the body may be illuminated from the rear by transmitted light or by edge lighting or the like.

The indicating instrument is in the form of a manometer which is designed so that a convenient scale length can be selected regardless of the depth of fluid to be measured, within wide limits, and irrespective of the density of the indicating fluid. The transducer is of simple construction so that it can be readily inserted as accessory equipment in existing vehicles, as well as being convenient for installation in original equipment manufacture. For example, when inserting the device, a small diameter hole may be drilled in the top of the fuel tank, and the tube may be extended through the hole and the parts can be assembled as shown in FIGURE 1. The transducer is constructed so that trapped air in the air reservoir casing within the liquid container is not likely to be removed by agitation of liquid around this reservoir casing or changes in vapor pressure of the liquid being measured. Particularly when the level of the liquid 15 in the tank is fairly low, however, as indicated in FIGURE 1, such agitation resulting from movement of the automobile or other vehicle in which the tank 14 is installed, will result in the lower hole 21 in tube 11 being intermittently uncovered. Each time this hole is uncovered air will be admitted to the interior of tube 11 from the tank and will rise in such tube to displace from it and from the air reservoir casing 17, liquid which may have risen any substantial distance into such tube or casing. There is thus provided a means for automatically replenishing the air-vapor in the air reservoir casing so as to insure continuous accurate indication of liquid level without further human attention.

As shown in FIGURE 1, restricted or limited communication is established between the interior of tube 11 and the interior of the air reservoir casing 17 such as by the plurality of holes 22 and 23. Whatever may be the number of holes communicating between tube 11 and the air reservoir casing 17, the uppermost hole 23 is arranged just under the top of the air reservoir casing and the lowermost hole 22 is arranged just above the bottom of the air reservoir casing. Such plurality of holes permit pressure balance between the contents of the cup and the bore of the tube. The third hole 21 in the tube is just below the bottom of the air reservoir casing 17 and permits pressure balance between the liquid in the tank and the lower portion of the tube 11. Air entering the tube 11 below the air reservoir casing 17, such as through the hole 21 as the liquid 15 in the tank sloshes about to convey air to the tube, will rise in such tube first to displace liquid in it downwardly. If there is some liquid in the air reservoir casing 17, air will also enter the upper portion of such casing, such as through hole 23, which will displace liquid from such casing through a lower hole in the tube 11, such as hole 22, into the interior of tube 11. As air is thus repeatedly admitted to the lower portion of tube 11, the liquid in such tube and air reservoir casing will be forced downward progressively until the liquid level reaches the location of hole 21. Thus, there is provided a transducer wherein the tube and air reservoir casing are automatically self-draining of liquid and self-filling with air vapor.

In addition, the two small holes 22 and 23 inside the air reservoir casing 17 in connection with the tube wall provide a very effective baffle to greatly reduce the effect of agitation of fluid contained in the tank and serve to isolate the air-vapor in the reservoir from effects of such agitation.

The 1" portion of tube 11 extending below the air reservoir casing 17 now performs two additional functions. First, it acts as a stilling tube or baffle to further reduce effects of agitation of fluid within the tank and the hole 21 in this portion of the tube just below the air reservoir casing, acts as a balance port to equalize pressure between the liquid in the tank and this 1" portion of the tube by permitting egress of surplus vapor-air from the tube to the tank so as not to introduce error into the reading of the indicating instrument. Thus as the level of the liquid 15 in the tank falls so as to reduce the pressure on the vapor in the tube 11 and air reservoir casing 17, the excess air caused by the expansion resulting from such pressure reduction will escape into the tank through the hole 21. This hole 21 also permits ingress of air-vapor, as may be required, into the tube 11 when the liquid level falls substantially to the location of such hole. Furthermore, this lower 1" portion of the tube 11 acts to form a flow path for any liquid trapped in the air reservoir casing and tube in such a manner that surface tension does not act to trap the liquid up in the tube and the air reservoir casing when the liquid level falls approximately to the casing bottom and the lowermost hole 21 in the tube.

Thus, it will be seen that there is provided an arrangement wherein air-vapor will enter the lower hole and displace liquid such as gasoline, downward which is the object of this portion of the device. Consequently, as the level of the liquid 15 in the tank drops to approach the level of hole 21, there is no possibility of the air-vapor pressure in tube 11 dropping below atmospheric pressure so as to cause the gauge to give an indication of a liquid level less than it actually is, which would be the case if any substantial amount of gas were allowed to escape from tube 11 and was not replaced from the relatively large air reservoir casing 17. The air reservoir casing included in the transducer of the present invention will reliably and automatically be maintained substantially full of air-vapor in the manner described above.

Also, applicant has provided an improved manometer as previously described. The liquid 44 may be a dyed silicone oil and there is further provided the mercury 43 and this permits the manometer to be designed with any desirable scale spread for any particular tank within wide limits. For example, for certain types of vehicles, a scale spread of 7/8" may be provided which makes a compact instrument and which is very readable.

Thus, it will be seen that there has been provided a simple and reliable means for automatically insuring a supply of air-vapor in the transducer and the present invention is automatic in operation. In the past, agitation of liquid in a vehicle tank has been a source of trouble and a major problem but with the present invention, agitation is simply taken advantage of in this respect since the surging and agitation of the liquid is used to maintain the air-vapor balance.

An air-vapor head space is provided over the mercury in space 38 so that there is no danger of colored indicating fluid being forced up into the communicating passage 35—37. Thus, the air or head space permits rise and fall of level in the space 43 without danger of the indicating fluid entering the communicating passageway 35 or 37.

The minimum bore size of tube 10 may be .250" to .269" for maintaining efficient operation and it has been found that this minimum bore size is essential to efficient operation of the device.

Minor changes in shape, size and rearrangement of details coming within the field of invention claimed may be resorted to in actual practice, if desired.

I claim:
1. In a liquid level measuring apparatus, a transducer comprising an air reservoir casing, and a continuous upright tube having an open lower end and having said casing secured to said tube adjacent to but above its open lower end, said casing being sealed except for restricted communication between the interior of said tube and the interior of said casing at different elevations spaced apart a substantial distance.

2. In a liquid level measuring apparatus, a transducer comprising an upright tube, and an air reservoir casing secured to said tube, said casing being sealed except for restricted communication with the interior of said tube, the wall of said tube having an air pressure equalizing aperture therein adjacent to the top of said casing and the wall of said tube having a liquid drain aperture therein adjacent to the bottom of said casing.

3. In a liquid level measuring apparatus, a transducer comprising an upright tube, and an air reservoir casing secured to said tube and having its lower portion disposed adjacent to but spaced upward from the lower end of said tube, the interior of said casing communicating only with the interior of said tube and the wall of said tube being apertured for the purpose of establishing such communication, and said tube having an aperture through its wall below the bottom of said casing and spaced upwardly from the lower end of said tube.

References Cited in the file of this patent

UNITED STATES PATENTS

| 813,096 | House | Feb. 20, 1906 |
| 1,629,992 | Carter | May 24, 1927 |
| 1,646,957 | Eynon | Oct. 25, 1927 |
| 1,246,270 | Huffman | Nov. 13, 1927 |

FOREIGN PATENTS

| 562,823 | France | Sept. 15, 1923 |
| 653,316 | France | Nov. 8, 1928 |